United States Patent [19]

Schriefer

[11] Patent Number: 5,167,089

[45] Date of Patent: Dec. 1, 1992

[54] FISHING LURE

[76] Inventor: Robert D. Schriefer, 2421 Elden, Apt. D, Costa Mesa, Calif. 92627

[21] Appl. No.: 757,450

[22] Filed: Sep. 10, 1991

[51] Int. Cl.⁵ .................................................. A01K 85/00
[52] U.S. Cl. ................................... 43/42.36; 43/42.28
[58] Field of Search ............... 43/42.36, 42.28, 42.25, 43/42.05, 42.09, 44.9, 44.92, 42.11

[56] References Cited

U.S. PATENT DOCUMENTS

| | | | |
|---|---|---|---|
| 655,603 | 8/1900 | Cantrell | 43/42.09 |
| 1,454,820 | 5/1923 | Readle | 43/42.05 |
| 2,278,876 | 4/1942 | Hart | 43/42.09 |
| 2,290,512 | 7/1942 | Weesner | 43/42.09 |
| 2,625,767 | 1/1953 | Pokras | 43/42.05 |
| 2,983,065 | 5/1961 | Ferguson et al. | 43/42.09 |
| 3,087,274 | 4/1963 | Franklin | 43/42.28 |
| 3,143,824 | 8/1964 | Thomas | 43/42.11 |
| 3,359,674 | 12/1967 | Strumor | 43/42.06 |
| 3,427,744 | 2/1969 | Roberts | 43/42.05 |
| 3,867,781 | 2/1975 | Wolfe | 43/42.09 |
| 3,947,989 | 4/1976 | Bart | 43/42.09 |
| 3,996,688 | 12/1976 | Hardwicke, III | 43/42.09 |
| 4,054,004 | 10/1977 | Schott | 43/42.09 |
| 4,163,337 | 8/1979 | Kress | 43/42.05 |
| 4,215,506 | 8/1980 | LeBoeuf | 43/42.05 |
| 4,329,804 | 5/1982 | Brown | 43/42.09 |
| 4,380,884 | 4/1983 | Pond | 43/42.09 |
| 4,520,588 | 6/1985 | Hindermyer | 43/42.06 |
| 4,619,067 | 10/1986 | West | 43/42.09 |
| 4,777,757 | 10/1988 | de Marees van Swinderen | 43/42.06 |
| 4,831,768 | 5/1989 | Sorace | 43/42.09 |

Primary Examiner—Richard K. Seidel
Assistant Examiner—Jeanne M. Elpel
Attorney, Agent, or Firm—Knobbe, Martens, Olson & Bear

[57] ABSTRACT

A fishing lure having a head, a body with skirts of contrasting colors attached to the body, a leader through an axial bore in the head of the body and the leader attached to the eye of a hook rearward of the body. The body includes axial extensions in either end for insertion into said head, making the body and skirts reversible to change decorative colors. A second head attaches to the rear of the body adds weight to the line. Two or more bodies interconnected by a coupling added weight to the lure and a second skirt.

13 Claims, 3 Drawing Sheets

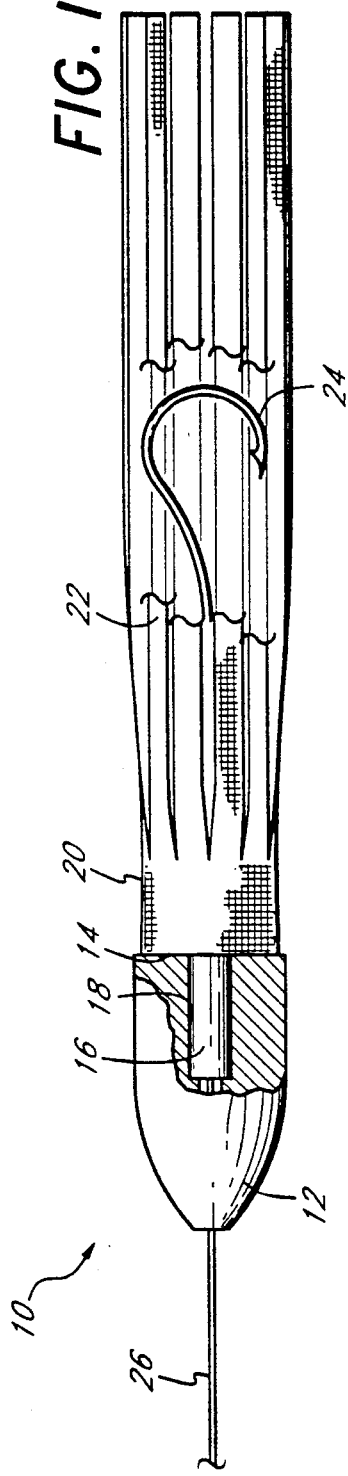
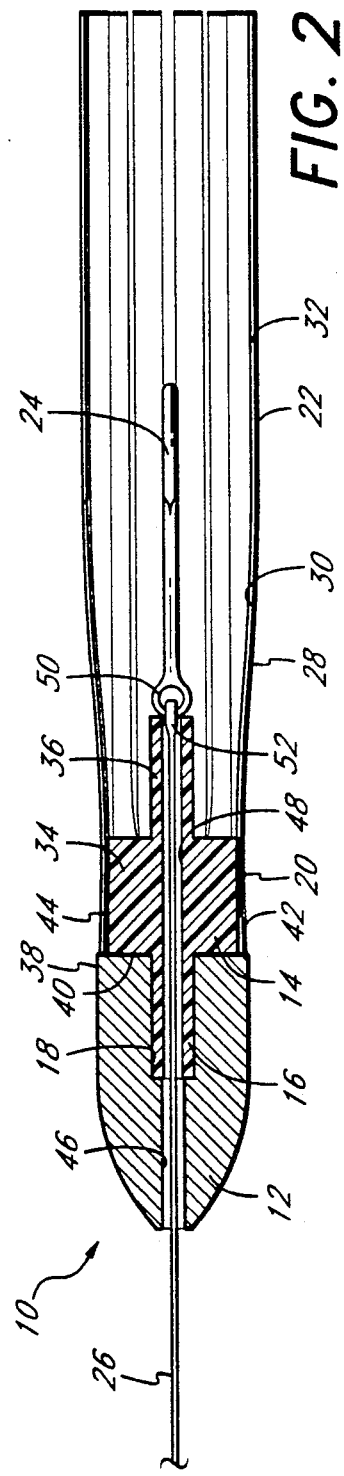
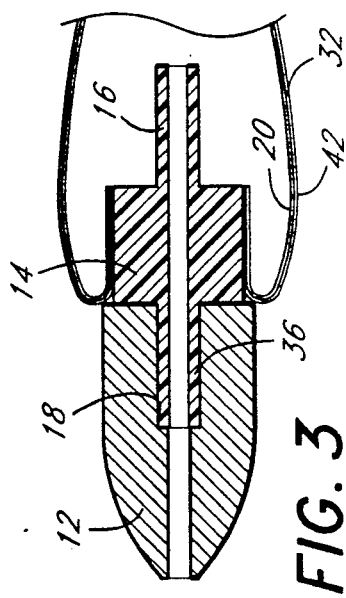

FISHING LURE

BACKGROUND OF THE INVENTION

This invention relates to the field of sport fishing equipment, and more particularly to fishing lures for trolling, having replaceable decorative and fish attracting skirts or shrouds to provide a wide selection of lures with a minimum of parts.

Skirts or shrouds are available in a wide color range with different degrees of reflectiveness and brilliance. Attachment of these skirts or shrouds to the head of a lure must be in a removable fashion for interchangeability at minimal cost and parts.

Lures have been fashioned after smaller marine life so as to deceive game fish into taking the bait or lure. Although the leading portion or head of the lure may resemble the head of bait fish, it is believed the body and attached streamers or skirt attract the game fish.

An early example of these streamers or skirts is the use of feathers peripherally attached to a disk-like body, as seen in U.S. Pat. No. 3,867,741 —Wolfe, having a stem or head stop positioned axially to one end. The body has an axial bore through the stem and the disk. A head, also with an axial bore, slidingly fits over the stem of the body. A leader, attached to a fishhook, feeds through the axial bore of the body and terminates in front of the head and is affixed to a fishing line. If another color of skirt is desired, the complete body is replaced, sliding a different body into the head and again feeding the leader through the body. A disadvantage of this arrangement is the need for a separate set of feathers or skirt for each desired color.

U.S. Pat. No. 4,619,067 —West shows a fishing lure skirt made of a resilient tubular material, slit in small streamers at its trailing end, and with its forward section slid over a body and protruding somewhat and a head having a hollow tube embedded therein with a rearwardly extending threaded extension. A portion of the skirt is clamped between the body and the head. There being no permanent bond between the body and the skirt, loosening of the threaded connection and relaxation of this compression could allow the skirt to slide off the body.

U.S. Pat. No. 4,631,768 —Sorace shows a lure head and a rearwardly extending stud provided with an axial bore to receive a leader. A skirt is permanently bonded to the periphery of a nut-like body, which is threaded onto the stud.

U.S. Pat. No. 4,054,004 —Schott discloses a fishing lure having a hollow, tubular, decorative shroud with a threaded neck and a mating threaded cap which frictionally fits into a central cavity in the rear of a lure head. Striated surfaces on the cap and in the cavity allow the cap to be rotationally oriented to the head for alignment of decorative surfaces on the head and the shroud. An anchor centered around the shank of a hook provides further assurance of holding the cap within the head when the pull of the lure is from a fish trolling line to the eye of the hook forward of the head.

U.S. Pat. No. 3,996,688 discloses a fishing lure having a skirt with an elastic band, and it is shown mounted in two opposite orientations on a body member that remains in a single orientation.

Although the foregoing examples have various advantages, a need still exists for a versatile lure which provides the ability to use a variety of fish attracting colored skirts with a simplified inexpensive assembly.

SUMMARY OF THE INVENTION

The invention comprises a composite fishing lure head and body provided with axially aligned through bores to receive a leader. The leader is attachable to a fishing line forward of the lure and has a hook attached to it rearward of the axial bore of the body. The juncture or attachment of the leader to the hook is of such a size as to prevent the eye or any other part of the hook from entering the axial bore of the body. Shrouding this hook are trailing streamers of a skirt permanently bonded to the outermost periphery of the central portion of the body. The streamers are of a decorative color pattern on one surface of the skirt and are of a different decorative color pattern on the opposite surface. Thus, by reversing the orientation of the body into the head, the streamers are inverted and display the decorative color pattern outwardly that was previously on the inside of the shroud of the skirt.

The lure body has a cylindrical central portion with an outer diameter preferably slightly smaller than the outer diameter of the rear of the head. Alternatively, the lure body has a flat-sided central portion with a maximum outer width slightly smaller than the outer diameter of the rear of the head. The body further includes protruding sections on each end which have a substantially smaller outer diameter than the width of the central portion. Either protruding end section can be forcibly inserted into the counterbore of the head and remain frictionally affixed to the head until forcibly removed. This enables the skirt to be inverted, which can provide a different exterior color and a different skirt flaring appearance.

While the preferred embodiment of the invention achieves a simple releasable friction fit between the head and either protruding end of the body, an alternative embodiment employs an annular semi-circular groove formed within the counterbore of the head and a rusting annular bead or segments of a bead formed on the peripheral surfaces of the protruding ends of the body. Axial positioning of this groove and the bead or bead segments is such that either end surface of the central portion of the body will be held in close proximity to the back surface of the head.

BRIEF DESCRIPTION OF THE DRAWINGS

FIG. 1 is a side view of a fishing lure of the invention with exposed views of the body affixed to the head and the position of the hook shrouded within the skirt.

FIG. 2 is a cross-sectional view of the lure of FIG. 1.

FIG. 3 is a partial view of reversed alignment of the body and head of FIG. 2.

DESCRIPTION OF THE PREFERRED EMBODIMENT

Figure 4:
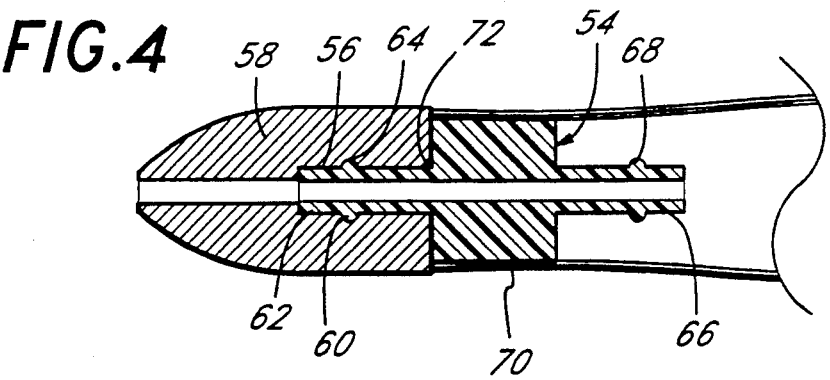
FIG. 4 is a partial cross-sectional view of an alternate embodiment of the invention of FIG. 1.

A fishing lure 10 is shown in FIG. 1 comprised of a head 12 affixed to a body 14 and a skirt 20 consisting of streamers 22 which shroud a hook 24. Running through the head and body is a leader 26 which attaches to the eye (not shown) of the hook 24.

As shown in FIG. 2, it is desirable to have one color on one surface 28 with another contrasting color or shade on the reverse side 30 of the same set of streamers 22. Also, it is desirable to have a second layer of streamers 32 immediately beneath the first layer. This inner layer may be, for example, a solid bright color or an iridescent shade, again in contrast to the outer colors. As the lure is pulled through the water, and the outer streamers 22 move about, glimpses of the second layer of streamers 32 may be observed.

In accordance with the invention, the body 14 has a cylindrical central portion 34, a forward, smaller diameter cylindrical protruding end 16 and a similar rearwardly protruding end 36. The outer diameter of the central portion 34 is slightly smaller than the outer diameter 38 of the back 40 of the head 12. This difference in diameters is sufficient to allow for at least one or two skirt layers or skirts 20 and 42 bonded to the outer surface 44 of the body portion 34. Bonding may be achieved in a variety of ways, depending on the final material selected. The inner skirt 42 is bonded to the body and the outer skirt 20 is overlaid and bonded to the inner skirt 42. The skirts are preferably constructed of relatively thin plastic sheets and the streamers are formed by slitting the sheets from approximately ½ from the forward or waist end to the opposite edge.

An axial bore 46 extends through the forward portion of the head 12, and includes a forward small diameter portion and a larger counterbore portion 18 formed in the back of the head 40. The inside diameter of this counterbore 18 should be such as to provide a manual press fit with the outer diameter of the end 16 or the end 36 of the body 14. The head 12 and the body 14 will remain affixed by the frictional engagement, yet can be easily disengaged without using anything other than hand pulling force.

The frictional engagement of the head 12 and the body 14 is only required to hold the lure assembly together while transporting or doing final assembly of fishing gear. When the fishing lure 10 is being drawn through the water, the leader 26, extending through the axial bore 46 of the head 12 and through the axial bore 48 of the body 14, is attached to the eye 50 of the hook 24. The juncture 52 of the leader 26 and the hook eye 50 should be of such size as to prevent entry of the eye 50 into the bore 48 of the body 14. Thus, pulling the leader 26, pulls the eye 50 or attachment 52 against the body 14, propels the lure 10 through the water, and also urges the body towards the head.

A main feature of the invention is shown in FIG. 3, wherein the body 14 has been reversed, engaging the second protruding end 36 with counterbore 18 of the head 12. Thus, the skirt assemblies 20 and 42 have been reversed such that the inner or second layer of streamers 32 is now the outer layer, and the original outermost color 28 is now the innermost color. Also, depending on the stiffness of the streamers and because of the doubling of the forward ends of the streamers 20 and 42, they will flare outwardly somewhat and take on a different appearance in shape as well. This system effectively doubles the lure combinations without any additional parts. In use, it is a simple procedure to disconnect the hook from the leader and quickly manually reverse the body and skirt.

Figure 7:
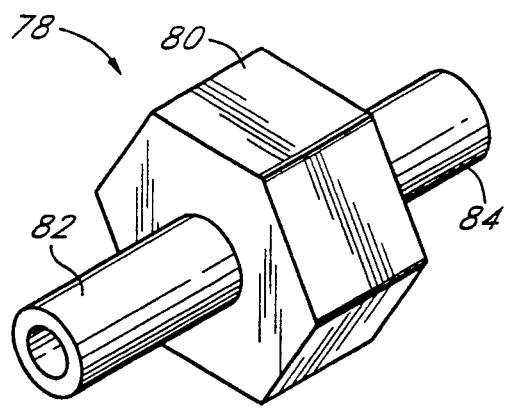
FIG. 7 is a perspective view of an alternative form of the body of FIG. 4.

In a preferred embodiment of the invention, shown in FIG. 7, the body 78 has a flat-sided central portion 80, a forward, smaller diameter cylindrical protruding end 82 and a similar rearwardly protruding end 84, as before. More preferably, there are six equal sides resulting in a hexagonal configuration. The flat-sided body 78 is interchangeable with the cylindrical body 14 of FIG. 1. A corner-to-corner span of the central portion 80 is slightly smaller than the outer diameter 38 of the back 40 of the head 12. This difference in diameters is sufficient to allow for at least one or two skirt layers or skirts 20 and 42 bonded to the flat sides 86 of the body portion 80. Bonding may be achieved in a variety of ways.

This flat-sided arrangement is preferable over the cylindrical configuration because the streamers 22 may bend backwards with more ease than when attached to a cylindrical central portion 34. Upon reversal of the body 78, shown as the analogous body 14 in FIG. 3, the streamers 22 are bent out and backwards. Although the streamers 22 are constructed of relatively thin plastic sheets, and are thus quite flexible, there is a certain structural resistance to bending outward upon attaining an inward concave curvature, as is the case with streamers 22 bonded to a cylindrical central portion 34. When the streamers 22 are bonded to the flat sides of body 78 there is only a resistance to bending due to the limited material stiffness. Another advantage of the flat-sided configuration of body 78 is its the increased ease of connection and disconnection from the head 12. In the case of a tight frictional fit, a twisting motion to engage or disengage may be required which may be difficult to accomplish with wet hands without the hex nut-like surface of body 78.

As an alternative to the frictional engagement of the components, FIG. 4 illustrates a second embodiment of the invention wherein the body 54 is pressed by hand into counterbore 56 of the head 58 until an annular ring 60 on the first protruding end 62 of the body 54 snaps into an annular groove 64 of the counterbore 56 of the head 58.

The new body 54, except for the annular rings, is in all other respects the same as body 41, or, preferably, body 78. The body 54 of FIG. 4 has a first protruding end 62 and a second protruding end 66 with annular rings 60 and 68, respectively. The central portion 70 of the body 54 is the same as the central portion 34 of FIG. 2, or, preferably, central portion 70 of body 54 may be configured identically to flat-sided central portion 80 of FIG. 7.

Referring again to FIG. 4, the annular rings 60 and 68 are positioned midway along the first and second protruding ends 62 and 66 of the body 54. The shape of the annular rings 60 and 68 is generally semicircular and approximately 0.005" high and 0.010" wide at the base. The groove in the counterbore should be approximately 0.010" deep and 0.20" wide. These dimensions are approximate because the actual sizes must be adjusted depending on the clearance allowed between the outer diameter of the body protruding ends 62 and 66 and the inside diameter of the counterbore 56.

A slight relief 72, such as a taper or chamfer, should be provided in the counterbore 56 to start deforming the annular ring 60 as it enters the counterbore 56. The relief 72 should be sufficiently wide to accommodate the height of the annular ring 60 and should slope at approximately 30° to the side wall of the counterbore.

Figure 5:
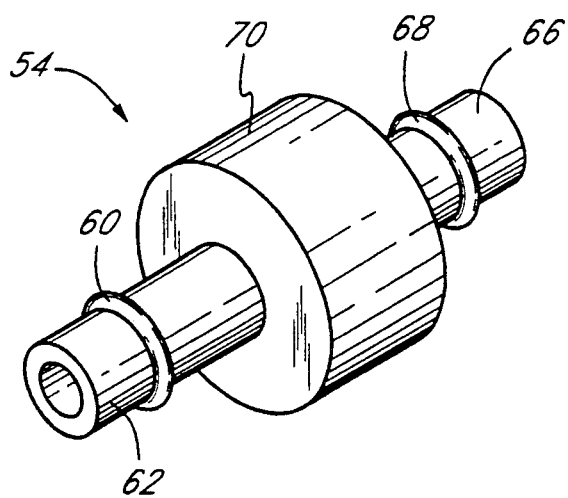
FIG. 5 is a perspective view of the body of FIG. 4.

A perspective view as shown in FIG. 5 illustrates the relative position and size of the annular ring 60 on the end 62 of the body 54. The dimensions of the semicircular ring are important to the extent they must be sufficient to interlock into the annual groove 64 of the counterbore 56 (FIG. 4), however, it is important they be sufficiently small so as to pull free of the mold (in the event they are molded and not machined). It is common practice to have slight protrusions molded onto plastic parts, allowing them to temporarily deform as they are pulled from the mold. Such rings or detents are common for example on small plastic boxes where the lids snap over the detent and hold the lid closed.

Similarly, if the head 58 were to be molded of plastic, the groove 64 can be made in the same way. That is, to pull the mold free with minor momentary deformation of the plastic part. In the event the head 58 were made of stainless steel the groove can be machined in by cutting or it may be rolled in place.

Figure 6:
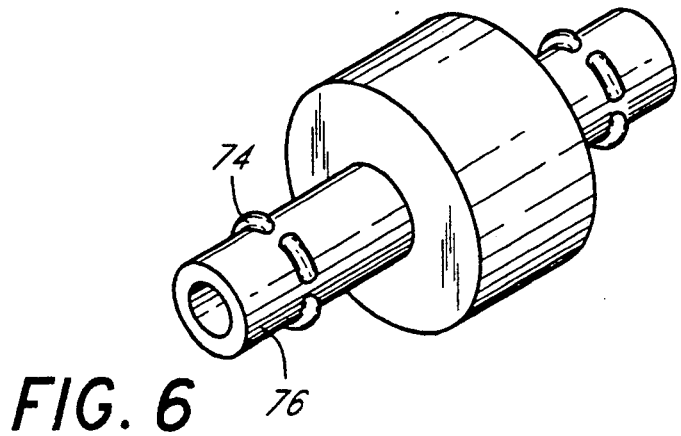
FIG. 6 is a perspective view of an alternative form of the ring of FIG. 4.

Another variation of the annular ring 60 (FIG. 5) is shown in FIG. 6 wherein the ring is broken into small segments 74.

Figure 8:
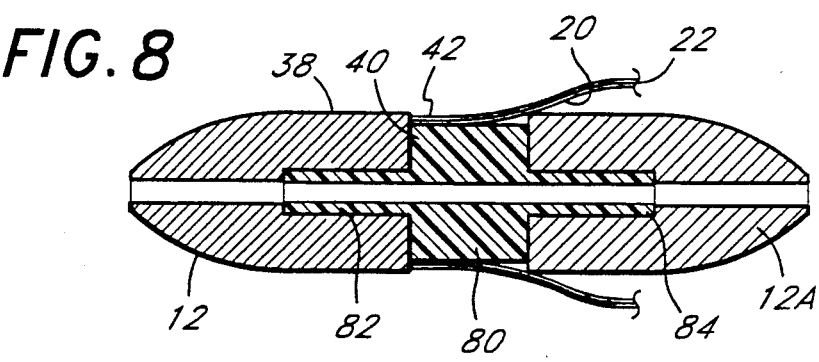
FIG. 8 is a sectional view of an alternative combination of the fishing lure.

Another variation on the fishing lure assembly is shown in FIG. 8. Here, a second head 12a, identical to the first head 12, is attached to the rear projection 84 of body 78, with the nose extending rearwardly. The resulting combination provides added weight for trolling at a lower depth.

Figure 9:
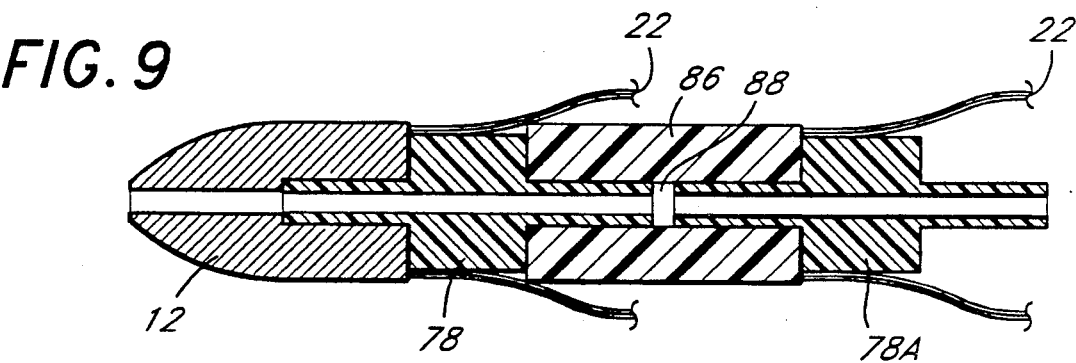
FIG. 9 is a cross-sectional view of a second alternative combination of the fishing lure.

A further variation of the fishing lure is seen in FIG. 9. A coupling sleeve 86 is disposed between the first body 78 and a second body 78a identical to body 78. The coupling sleeve 86 is cylindrical or flat sided as desired, with a through bore 88 whose diameter is slightly smaller than that of ends 82 and 84 to provide for friction engagement. The added body portion 78a adds another row of streamers 22 disposed axially rearward of the first row. This may present an enhanced appearance to fish and, as with the attachment of a second head 12a, the extra weight lowers the trolling depth.

What is claimed is:

1. A fishing lure, comprising:
   a head having an axial bore;
   a tubular body having a central portion and a tubular protruding end on each end of the body; and
   a skirt having a waist surrounding and permanently attached to the outer periphery of the body central portion, and having rearwardly extending streamers attached to the waist;
   each protruding end of the body being adapted to be removably affixed within the head bore, whereby the body with the skirt attached may be attached to the head in either of two positions, with the skirt providing a different appearance in each of the two positions.

2. The lure of claim 1, wherein one of said body ends is frictionally fit within said head axial bore.

3. The fishing lure as in claim 1 in which said skirt has an inner layer of one color bonded to the body central portion and a second layer of a contrasting color bonded to the first layer.

4. The fishing lure as in claim 3 in which the body is reversed with relation to the head, and the skirt is doubled out and back on itself such that the second layer is now shrouded within the streamers of the first layer.

5. The lure of claim 1 wherein said head has a cylindrical counterbore in its rear portion which is larger in diameter than the bore in the forward portion of the head, said body ends being adapted to fit within said counterbore.

6. The lure of claim 1, wherein said bore has an annular groove in its wall and said body ends each have an annular bead on its peripheral surface positioned to interlock with said groove in the counterbore of the head when either end is slidingly engaged within the bore of the head.

7. The lure of claim 1, including a second head removably affixed to the protruding end opposite to which the first head is attached.

8. The lure of claim 1, including a tubular coupling sleeve having one end frictionally retained on the protruding end of said body opposite the end attached to said head, and a second body frictionally retained in a second end of said sleeve.

9. The lure of claim 8, including a skirt attached to said second body.

10. A fishing lure, comprising:
    a head having an axial bore from its tip through the head and having a larger axial counterbore in the rearward portion of the head;
    a body having first and second cylindrical protruding ends and a central main portion, said main portion having a diameter slightly smaller than the outer diameter of the rear of the head, and said first and second ends having substantially smaller diameters than the main portion, said body having an axial throughbore, and either of said ends being adapted to be frictionally retained in said counterbore;
    a first and a second skirt having a waist permanently bonded to the main body portion, said skirts being slit into rearwardly extending streamers, said first skirt being of one color and said second skirt being of a contrasting color, the color of the first skirt being displayed outwardly when the body is oriented with the head in one direction and the contrasting color of the second skirt being displayed outwardly when the orientation of the body with the head is reversed;
    a leader threaded through the axial bores of the head and the body; and
    a hook attached to the leader rearward of the body and the head, said axial throughbore being of such size as to prevent an eye of the hook from being pulled into the axial bore of the body.

11. The lure of claim 10, wherein said body main portion has a flat sided exterior.

12. A method of providing two different appearances for a single fishing lure comprising the steps of:
    inserting an end of a tubular fishing lure bore into the rear of a fishing lure head, said body having a fishing lure skirt permanently attached to a central portion of the body with the skirt having streamers extending rearwardly from the body to provide a first appearance;
    withdrawing said body from said head; and
    inserting an opposite end of said body into the rear of said lure head, causing said skirt streamers to fold back upon themselves and extend rearwardly, thus exposing on the exterior of the skirt, a side of the skirt that was previously on the interior in said first appearance.

13. A fishing lure, comprising:

a head having a bore from its tip to its portion for receiving a fishing line;

a first body having first and second ends and a central main portion, either of said ends being adapted to be releasably connected to the rear of said head, said body having a throughbore for said line;

a skirt having a waist attached to the main body portion, said skirt being slit into rearwardly extending streamers, said skirt presenting one appearance when the body is oriented with the head in one direction and a second appearance when the orientation of the body with the head is reversed;

a second body having a similar shape as said first body;

a skirt attached to said second body and having rearwardly extending streamers; and a connector releasably connecting said bodies to provide a lure with two rearwardly extending skirts.

* * * * *